US009359531B2

(12) United States Patent
Sherman et al.

(10) Patent No.: US 9,359,531 B2
(45) Date of Patent: Jun. 7, 2016

(54) TEMPORARILY REPOSITIONABLE PRESSURE SENSITIVE ADHESIVE BLENDS

(75) Inventors: Audrey A. Sherman, St. Paul, MN (US); Wendi J. Winkler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1021 days.

(21) Appl. No.: 12/867,833

(22) PCT Filed: Jan. 19, 2009

(86) PCT No.: PCT/US2009/031369
§ 371 (c)(1),
(2), (4) Date: Nov. 3, 2010

(87) PCT Pub. No.: WO2009/105297
PCT Pub. Date: Aug. 27, 2009

(65) Prior Publication Data
US 2011/0039099 A1    Feb. 17, 2011

Related U.S. Application Data

(60) Provisional application No. 61/030,245, filed on Feb. 21, 2008.

(51) Int. Cl.
| | |
|---|---|
| *C09J 7/02* | (2006.01) |
| *C09J 133/02* | (2006.01) |
| *C09J 133/08* | (2006.01) |
| *C09J 133/10* | (2006.01) |
| *C09J 133/14* | (2006.01) |
| *C09J 133/26* | (2006.01) |
| *C09J 143/04* | (2006.01) |
| *C09J 183/10* | (2006.01) |

(52) U.S. Cl.
CPC .............. *C09J 7/0246* (2013.01); *C09J 133/02* (2013.01); *C09J 143/04* (2013.01); *C09J 183/10* (2013.01); *C08L 2205/02* (2013.01); *C09J 7/0217* (2013.01); *C09J 133/08* (2013.01); *C09J 133/10* (2013.01); *C09J 133/14* (2013.01); *C09J 133/26* (2013.01); *C09J 2203/318* (2013.01); *C09J 2205/114* (2013.01); *C09J 2433/00* (2013.01); *C09J 2483/00* (2013.01); *Y10T 428/2891* (2015.01)

(58) Field of Classification Search
None
See application file for complete search history.

(56) References Cited

U.S. PATENT DOCUMENTS

| | | |
|---|---|---|
| 3,786,116 A | 1/1974 | Milkovich |
| 3,842,059 A | 10/1974 | Milkovich |
| 4,472,480 A | 9/1984 | Olson |
| 4,693,935 A | 9/1987 | Mazurek |
| 4,736,048 A | 4/1988 | Brown |
| 4,737,559 A | 4/1988 | Kellen |
| 4,980,443 A | 12/1990 | Kendziorski |
| 5,223,465 A | 6/1993 | Ueki |
| RE34,605 E | 5/1994 | Schrenk |
| 5,308,887 A | 5/1994 | Ko |
| 5,360,659 A | 11/1994 | Arends |
| 5,579,162 A | 11/1996 | Bjornard |
| 5,882,774 A | 3/1999 | Jonza |
| 6,049,419 A | 4/2000 | Wheatley |
| 6,277,485 B1 | 8/2001 | Invie |
| 6,800,680 B2 | 10/2004 | Stark |
| 7,070,051 B2 * | 7/2006 | Kanner et al. ............... 206/382 |
| 2001/0007003 A1 | 7/2001 | Karim |
| 2004/0202879 A1 | 10/2004 | Xia |
| 2006/0057367 A1 * | 3/2006 | Sherman et al. ............. 428/343 |
| 2006/0246296 A1 * | 11/2006 | Xia et al. ..................... 428/412 |
| 2006/0291055 A1 | 12/2006 | Gehlsen |
| 2007/0213463 A1 * | 9/2007 | Sherman et al. ............. 525/100 |
| 2009/0110861 A1 * | 4/2009 | Sherman ..................... 428/41.8 |

FOREIGN PATENT DOCUMENTS

| | | |
|---|---|---|
| CN | 1257902 | 6/2000 |
| CN | 1938390 | 3/2007 |
| JP | 03-006277 | 1/1991 |
| WO | WO 84/03837 | 10/1984 |
| WO | WO 97/22675 | 6/1997 |
| WO | WO 2007/145996 | 12/2007 |

OTHER PUBLICATIONS

Nakanishi, "Improvement of the Conductivity of Polydiacethylenes by Chemical and Physical Methods", ACS Polymer Preprints 25 (1), 244-245, (1984).
Handbook of Pressure Sensitive Adhesive Technology, edited by Donatas Satas (1982).
Kawakami, "Synthesis of Silicone Graft Polymers and a Study of Their Surface Active Properties", Makromol. Chem. 185, 9-18 (1984).
Kawakami, "Silicone Macromers for Graft Polymer Synthesis", Polymer J. 14, 913-917, (1982).
International Search Report for PCT/US2009/031369, 3 pages.

* cited by examiner

*Primary Examiner* — Frank D Ducheneaux
(74) *Attorney, Agent, or Firm* — Jeffrey M. Olofson

(57) ABSTRACT

Temporarily repositionable pressure sensitive adhesive compositions which are blends of a silicone-modified pressure sensitive adhesive component, a high Tg polymer component and a crosslinker are presented. The silicone-modified pressure sensitive adhesive includes a copolymer that is the reaction product of an acidic or basic monomer, a (meth)acrylic or vinyl monomer, and a silicone macromer. The high Tg polymer component contains acid or base functionality such that when mixed, the silicone-modified pressure sensitive adhesive component and the high Tg polymer component form an acid-base interaction.

20 Claims, No Drawings

TEMPORARILY REPOSITIONABLE PRESSURE SENSITIVE ADHESIVE BLENDS

CROSS REFERENCE TO RELATED APPLICATIONS

This application is a national stage filing under 35 U.S.C. 371 of PCT/US2009/031369, filed Jan. 19, 2009, which claims priority to U.S. Provisional Application No. 61/030,245 filed Feb. 21, 2008 the disclosure of which is incorporated by reference in its/their entirety herein.

FIELD OF THE DISCLOSURE

The disclosure relates to adhesive compositions. In particular, the disclosure relates to pressure sensitive adhesive compositions, methods of using such adhesives, and articles prepared using the adhesives, such as optical articles.

BACKGROUND

Pressure sensitive adhesives have significant commercial application. Optical applications for pressure sensitive adhesives have specialized requirements, especially clarity and stability. A useful adhesive for optical applications should be optically clear, and should also maintain that clarity over the life of the product in which it is used. The adhesive should withstand conditions present during manufacturing of optical elements and during use of such elements without losing a substantial amount of clarity. This property involves the adhesive being stable on its own, and also being stable and compatible when used with other elements in an optical element or optical product.

Optical elements include components bonded together by the adhesive. The adhesives are used, for example, to bond materials to polymeric materials such as polyesters; to bond materials to rigid materials such as rigid polycarbonate, polymethyl methacrylate, or glass; to bond materials to polarizer layers; etc.

Often, any of these components of an optical element can adversely affect the stability, clarity, bond strength, or other performance property of an adhesive in the same optical element. Polycarbonates, for example, are known to outgas in response to changing environmental conditions such as heat and humidity, producing bubbles or partial or full delamination at the adhesive bond between the polycarbonate and another layer of an optical element. Bubbling and delamination can be particularly common when the outgassing layer is bonded to another layer or laminate that exhibits low vapor transmissivity. Bubbles and delamination can affect clarity and integrity of the optical element, and should be avoided. It can be preferred, therefore, in these and other settings, that an adhesive be stable and not delaminate, bubble, or lose its clarity or integrity during use.

SUMMARY

Optically clear pressure sensitive adhesives that resist delamination and bubble formation when laminated to outgassing substrates and also are temporarily repositionable upon lamination are desirable. Temporary repositionability permits ease of assembly of optical articles, and resistance to outgassing permits optical articles with long work lives. The pressure sensitive adhesives that are temporarily respositionable are desirable because they may be easily removed and repositioned during assembly of articles if a defect in lamination is detected. In these instances, repositionability may mean at least partial removal and relamination of the adhesive layer or it may mean complete removal and discarding of the adhesive layer to permit relamination with a fresh adhesive layer.

The disclosure includes an adhesive composition comprising a blend of a majority of a silicone-modified pressure sensitive adhesive component, where the silicone-modified pressure sensitive adhesive comprises a copolymer that is the reaction product of an acidic or basic monomer, a (meth) acrylic or vinyl monomer, and a silicone macromer. Also included in the adhesive composition are a high Tg polymer comprising an acid or base functionality and a crosslinker. The functionality of the silicone-modified pressure sensitive adhesive component and the functionality of the high Tg polymer form an acid-base interaction when mixed and the composition is a pressure sensitive adhesive.

Also disclosed are multi-layer assemblies coated with an adhesive composition comprising a mixture of a majority of a silicone-modified pressure sensitive adhesive component comprising at least one polymer with an acid or base functionality, a high Tg polymer comprising an acid or base functionality, and a crosslinker. The functionality of the silicone-modified pressure sensitive adhesive component and the functionality of the high Tg polymer form an acid-base interaction when mixed and the adhesive composition is an optically clear pressure sensitive adhesive that bonds at least two layers together.

Also disclosed are methods of preparing a multi-layer articles, the method comprising coating onto a substrate an adhesive composition including a mixture of a majority of a silicone-modified pressure sensitive adhesive component comprising at least one polymer comprising an acid or base functionality, a high Tg polymer comprising an acid or base functionality, and a crosslinker. The functionality of the silicone-modified pressure sensitive adhesive component and the functionality of the high Tg polymer form an acid-base interaction when mixed and the composition is a pressure sensitive adhesive. In some embodiments the method also includes laminating the adhesive coated substrate on a second substrate. The method may also include the step of repositioning the adhesive coated substrate on the second substrate.

DETAILED DESCRIPTION

Optically clear pressure sensitive adhesive blends are provided which are able to both be temporarily repositionable upon lamination and also are able to maintain their optical clarity over the lifetime of the article in which the optically clear adhesive is laminated, even articles with outgassing substrates. This is particularly difficult because the two needs (temporary repositionability, i.e. low adhesive strength initially and high adhesive strength to be able to resist delamination and bubble formation when laminated to outgassing substrates) are contradictory. Optically clear pressure sensitive adhesive blends are provided that are able to fulfill these contradictory demands.

The optically clear, temporarily repositionable pressure sensitive adhesive blends are compatibilized compositions that comprise a majority of a silicone-modified pressure sensitive adhesive component, a high Tg polymer, and a crosslinker. The optically clear, temporarily repositionable pressure sensitive adhesive comprises a copolymer which has pendant polysiloxane grafts which cause the exposed surface of a layer of the adhesive composition to initially have a lower degree of adhesiveness. Upon application, however, the pendant polysiloxane grafts appear to migrate into the body of the layer and the adhering surface builds adhesiveness to form a strong adhesive bond. Thus a temporary chemical surface modification of the pressure sensitive adhesive composition is effected such that temporary repositionability of an article bearing the coating of pressure sensitive adhesive is possible without hindering the ultimate adhesive strength of the pressure sensitive adhesive—adherend bond. In some embodiments, the initial adhesion, as measured by the 180° Peel Adhesion Test described in the Examples section below, is greater than 0.1 N/dm but less than 5 N/dm or 0.1-3.0 N/dm or even 0.1-1.0 N/dm. In some embodiments the adhesion after a 24 hour dwell (i.e. the adhesive or adhesive article are laminated to a substrate for 24 hours under ambient conditions), as measured by the 180° Peel Adhesion Test described in the Examples section below, is greater than 50 N/dm but less than 100 N/dm or 50-80 N/dm or even 50-70 N/dm.

Unless otherwise indicated, "optically clear" refers to an adhesive or article that has a high light transmittance over at least a portion of the visible light spectrum (about 400 to about 700 nm), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

As used herein, "temporarily repositionable" refers to the ability to be adhered to and removed from a substrate without substantial loss of adhesion capability. However, over time the adhesive bond strength builds. This is in contrast to adhesives that are "repositionable" which refers to the ability to be repeatedly adhered to and removed from a substrate without substantial loss of adhesion capability and the adhesive does not develop excessive adhesion build-up over time.

As used herein the term "silicone-modified" refers to pressure sensitive adhesives that contain polymers that contain silicone macromers. Macromers are macromolecular monomers. The terms "silicone" or "siloxane" are used interchangeably and refer to units with dialkyl or diaryl siloxane (—SiR$_2$O—) repeating units.

As used herein the term "compatibilized" means that materials making up the adhesive composition form a stable multiphase morphology wherein the phases do not significantly coalesce and/or increase in size upon aging at temperatures at or above the glass transition temperature (Tg) of the materials.

As used herein, "high Tg polymer" means a polymer with a glass transition temperature higher than polymers used to form a pressure sensitive adhesive, e.g., temperatures typically exceeding 20° C.

The term "adhesive" as used herein refers to polymeric compositions useful to adhere together two adherends. An example of an adhesive is a pressure sensitive adhesive.

Pressure sensitive adhesives are well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives include polymers designed and formulated to exhibit the requisite viscoelastic properties resulting in a desired balance of tack, peel adhesion, and shear holding power.

"Polymer" refers to macromolecular materials having at least five repeating monomeric units, which may or may not be the same. The term polymer, as used herein, encompasses homopolymers and copolymers.

The terms "weight %", "wt %" and "% by weight" are used interchangeably and refer to the weight of component relative to a total composition weight. Therefore, if a component has a weight % of 30, that indicates there are 30 parts by weight of the component to a total composition weight of 100 parts by weight.

The silicone-modified pressure sensitive adhesive component and the high Tg polymer are compatibilized using a compatibilization scheme. As used herein the term "compatibilization scheme" refers to the method by which the silicone-modified pressure sensitive adhesive component and the high Tg polymer are made to be compatible with one another due to a modification of their interfacial interactions. The compatibilization scheme comprises functionalizing at least one polymer in the silicone-modified pressure sensitive adhesive and the high Tg polymer in such a way that an acid-base interaction is present between the two materials. The acid-base interaction that is present between the polymers may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons. The following general equation describes the Lewis acid-base interaction:

$$A(\text{acid})+B(\text{base}) \rightarrow A{:}B(\text{acid-base complex}).$$

The acid-base interactions between the polymer in the silicone-modified pressure sensitive adhesive and the high Tg polymer reduce their interfacial tension leading to a reduction in the dispersed phase particle size, and a stabilization of the multiphase morphology. The interfacial tension between the materials reduces the domain size of the high Tg polymer. In some embodiments, particularly those in optical applications, the domain size of the high Tg polymer dispersed within the silicone-modified pressure sensitive adhesive is less than the wavelength of light to produce optical clarity. In some embodiments the domain size of the high Tg polymer is less than 100 nanometers. In other embodiments, the domain size of the high Tg polymer is less than 50 nanometers.

The compatibilization scheme is independent of the particular functionality on the respective polymer. That is, either the silicone-modified pressure sensitive adhesive component or the high Tg polymer can contain the acid or the base functionality. For example, an acid functionalized polymer in the silicone-modified pressure sensitive adhesive component can be paired with a base functionalized high Tg polymer. Alternatively, a base functionalized polymer of the silicone-modified pressure sensitive adhesive component can be paired with an acid functionalized high Tg polymer.

Acrylate and methacrylate monomers are referred to collectively herein as "(meth)acrylate" monomers. (Meth)acrylate polymers may be copolymers, optionally in combination with other, non-(meth)acrylate, e.g., vinyl-unsaturated, monomers.

As used herein, an "acidic copolymer" is a polymer that is derived from at least one acidic monomer and at least one non-acidic copolymerizable monomer (i.e., a monomer that can not be titrated with a base). In one embodiment, at least one copolymerizable monomer is a (meth)acrylate monomer such as an alkyl (meth)acrylate monomer. The acidic copolymer may optionally be derived from other copolymerizable monomers, such as vinyl monomers and basic monomers, as long as the resultant copolymer can still be titrated with a base. Thus, usually more acidic monomers are utilized to prepare the acidic copolymers than basic monomers.

A "basic copolymer" is a polymer that is derived from at least one basic monomer and at least one nonbasic copolymerizable monomer (i.e., a monomer that cannot be titrated with an acid). Other monomers can be copolymerized with the basic monomers (e.g., acidic monomers, vinyl monomers, and (meth)acrylate monomers), as long as the basic copolymer retains its basicity (i.e., it can still be titrated with an acid). In one embodiment, at least one copolymerizable monomer is a (meth)acrylate monomer such as an alkyl (meth)acrylate monomer.

The optically clear, temporarily repositionable pressure sensitive adhesive blends are compatibilized compositions that comprise a majority of a silicone-modified pressure sensitive adhesive component, a high Tg polymer, and a crosslinker. The silicone-modified pressure sensitive adhesive component of the adhesive composition comprises either an acidic or basic copolymer that contains a silicone macromer.

Typically the silicone-modified pressure sensitive adhesive component is a copolymer containing either acidic or basic monomers, copolymerizable monomers and silicone macromer. The acidic or basic monomers define the functionality of the copolymer (either acidic or basic functionality), the copolymerizable monomers are used to adjust the properties of the copolymer (such as Tg, rheology, etc) and the silicone macromer provides repositionability.

In some embodiments the silicone-modified pressure sensitive adhesive component is a (meth)acrylate copolymer. (Meth)acrylate copolymers may contain acrylate, methacrylate as well as other vinyl functional monomers and macromers.

When the silicone-modified pressure sensitive adhesive component is an acidic (meth)acrylate copolymer, the copolymer typically is derived from acidic monomers comprising about 2% by weight to about 30% by weight, or about 2% by weight to about 15% by weight, of a copolymerizable acidic monomer. Generally, as the proportion of acidic monomers used in preparing the acidic copolymer increases, cohesive strength of the resulting adhesive increases. The proportion of acidic monomers is usually adjusted depending on the proportion of acidic copolymer present in the compatibilized blend.

Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability, typically ethylenically unsaturated carboxylic acids are used.

Similarly, when the silicone-modified pressure sensitive adhesive component is a basic (meth)acrylate copolymer, the copolymer typically is derived from basic monomers comprising about 2% by weight to about 50% by weight, or about 5% by weight to about 30% by weight, of a copolymerizable basic monomer.

A wide variety of basic monomers are useful. In some embodiments, the basic monomer is a nitrogen-containing monomer, such as those of Formula (I):

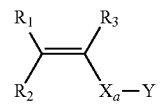

Formula (I)

wherein
a is 0 or 1;
$R_1$, $R_2$, and $R_3$ are independently selected from H— and $CH_3$— or other alkyl group,
X is selected from an ester or amide group; and
Y is an alkyl group, a nitrogen-containing aromatic, nitrogen-containing group, such as the group:

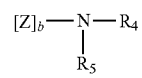

wherein
Z is a divalent linking group (typically about 1 to 5 carbon atoms);
b is 0 or 1; and
$R_4$ and $R_5$ are selected from hydrogen, alkyl, aryl, cycloalkyl, and arenyl groups.

$R_4$ and $R_5$ in the above group may also form a heterocycle. In all embodiments, Y, $R^1$, and $R^2$ may also comprise heteroatoms, such as O, S, N, etc. While Formula I summarizes the majority of basic monomers useful in the present disclosure, other nitrogen-containing monomers are possible if they meet the definition of a basic monomer (i.e., can be titrated with an acid).

Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, N-vinyl formamide, (meth)acrylamide, and mixtures thereof.

To achieve pressure sensitive adhesive characteristics, the (meth)acrylate copolymer can be tailored to have a resultant glass transition temperature (Tg) of less than about 0° C. through the use of copolymerizable monomers such as alkyl (meth)acrylates. Such copolymers typically are derived from monomers comprising about 40% by weight to about 97% by weight, or at least 70% by weight, at least 85% by weight, or even about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof. Optionally, other vinyl monomers and alkyl (meth) acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth) acrylate copolymer is less than about 0° C.

In some embodiments, it is desirable to use (meth)acrylate monomers that are free of alkoxy groups. Alkoxy groups are understood by those skilled in the art.

(Meth)acrylate copolymers contain at least one monofunctional unsaturated monomer selected from the group consisting of (meth)acrylate esters of non-tertiary alkyl alcohols, the alkyl groups of which comprise from about 1 to about 20, or about 1 to about 18 carbon atoms, such as those of Formula (II):

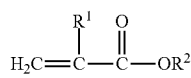

Formula (II)

wherein $R^1$ is H or $CH_3$, the latter corresponding to where the (meth)acrylate monomer is a methacrylate monomer, and $R^2$ is a linear, branched, aromatic, or cyclic hydrocarbon group. When $R^2$ is a hydrocarbon group, it can also include heteroatoms (e.g., oxygen or sulfur). Criteria to consider when selecting $R^2$ include cost and the form in which the copolymer will be incorporated into the adhesive.

Examples of suitable (meth)acrylate monomers useful in the present disclosure include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

When used, vinyl monomers useful in the acidic and basic copolymers include vinyl esters (e.g., vinyl acetate), styrene, substituted styrene (e.g., alpha-methyl styrene), vinyl halide, vinyl propionate, and mixtures thereof. Other useful vinyl monomers include macromeric (meth)acrylates such as (meth)acrylate-terminated styrene oligomers and (meth) acrylate-terminated polyethers, such as are described in PCT Patent Application WO 84/03837 and European Patent Application EP 140941.

To achieve temporary repositionability, silicone macromer is incorporated into the copolymer in the amount of about 0.01 to about 50% of the total monomer weight to obtain the desired degree of temporary repositionability. In some embodiments the amount of silicone macromer is 1-10 weight %, 1-5 weight % or even 3-5 weight %. The amount of silicone macromer included may vary depending upon the particular application, but in general, it is desirable to have a decrease (generally at least 20%) in the initial peel adhesion value relative to that of a control containing no siloxane.

The silicone macromer can have the general formula:

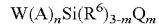

where W is a vinyl group, A is a divalent linking group, n is zero or 1, m is an integer of from 1 to 3; $R^6$ is hydrogen, lower alkyl (e.g., methyl, ethyl, or propyl), aryl (e.g., phenyl or substituted phenyl), or alkoxy, and Q is a monovalent siloxane polymeric moiety having a number average molecular weight above about 500 and is essentially unreactive under copolymerization conditions.

Such macromers are known and may be prepared by the method disclosed by Milkovich et al., as described in U.S. Pat. Nos. 3,786,116 and 3,842,059. The preparation of polydimethylsiloxane macromer and subsequent copolymerization with vinyl monomers have been described in several papers by Y. Yamashita et al., Polymer J. 14, 913 (1982); ACS Polymer Preprints 25 (1), 245 (1984); Makromol. Chem. 185, 9 (1984) and in U.S. Pat. No. 4,693,935 (Mazurek). This method of macromer preparation involves the anionic polymerization of hexamethylcyclotrisiloxane monomer to form living polymer of controlled molecular weight, and termination is achieved via chlorosilane compounds containing a polymerizable vinyl group.

Suitable monomers for use in the above-mentioned anionic polymerization are, in general, diorganocyclosiloxanes of the formula $(—Si(R^6)_2—O—)_r$ where each $R^6$ is as previously defined and r is an integer of 3 to 7. Examples of useful cyclic siloxanes include, $D_3$ where r is equal to 3 and each $R^6$ is methyl and $D_4$ where r is equal to 4 and each $R^6$ is methyl. The cyclic siloxanes being hereafter designated $D_3$ and $D_4$, respectively. $D_3$, which is a strained ring structure, is especially useful.

Initiators of the anionic polymerization are chosen such that monofunctional living polymer is produced. Suitable initiators include alkali metal hydrocarbons such as alkyl or aryl lithium, sodium, or potassium compounds containing up to 20 carbon atoms in the alkyl or aryl radical or in some instances up to 8 carbon atoms. Examples of such compounds are ethylsodium, propylsodium, phenylsodium, butylpotassium, octylpotassium, methyllithium, ethyllithium, n-butyllithium, sec-butyllithium, tert-butyllithium, phenyllithium, and 2-ethylhexyllithium. Lithium compounds are preferred as initiators. Also suitable as initiators are alkali metal alkoxides, hydroxides, and amides, as well as triorganosilanolates of the formula $R^7Si(R^6)_2—O-M$ where M is alkali metal, tetraalkylammonium, or tetraalkylphosphonium cation and where each $R^6$, is as previously defined and $R^7$ is an alkyl, alkoxy, alkylamino, aryl, hydroxyl or fluoroalkyl. The triorganosilanolate initiator lithium trimethylsilanolate (LTMS) is particularly useful. In general, the use of both strained cyclic monomer and lithium initiator reduces the likelihood of redistribution reactions and thereby provides siloxane macromonomer of narrow molecular weight distribution which is reasonably free of unwanted cyclic oligomers.

Molecular weight is determined by the initiator/cyclic monomer ratio, and thus the amount of initiator may vary from about 0.004 to about 0.4 mole of organometallic initiator per mole of monomer. Typically, the amount will be from about 0.008 to about 0.04 mole of initiator per mole of monomer.

For the initiation of the anionic polymerization, an inert, generally polar organic solvent can be utilized. Anionic polymerization propagation with lithium counterion typically uses either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene. The polar solvent serves to "activate" the silanolate ion, making propagation possible.

Generally, the polymerization can be carried out at a temperature ranging from about −50° C. to about 100° C., or from about −20° C. to about 30° C. Anhydrous conditions and an inert atmosphere such as nitrogen, helium, or argon are usually used.

Termination of the anionic polymerization is, in general, achieved via direct reaction of the living polymeric anion with halogen-containing termination agents, i.e., functionalized chlorosilanes, to produce vinyl-terminated polymeric monomers. Such terminating agents may be represented by the general formula $W(A)_n Si(R^6)_{3-m} Cl_m$ where Cl is a chlorine atom and where W, A, n, m, and $R^6$ have been previously defined. A preferred terminating agent is methacryloxypropyldimethylchlorosilane. The termination reaction is carried out by adding a slight molar excess of the terminating agent (relative to the amount of initiator) to the living polymer at the polymerization temperature. According to the aforementioned papers by Y. Yamashita et al., the reaction mixture may be ultrasonically irradiated after addition of the terminating agent in order to enhance functionality of the macromer. Purification of the macromer can be effected by addition of methanol.

The optically clear, temporarily repositionable pressure sensitive adhesive also contains a high Tg Polymer additive. The high Tg polymer additive comprises either an acidic or basic copolymer, depending on the functionality chosen for the silicone-modified pressure sensitive adhesive component. For example, if the silicone-modified pressure sensitive adhesive component comprises an acidic copolymer, then the high Tg polymer additive will be a basic copolymer to form a compatibilized blend.

To achieve the high Tg characteristics of the polymer additive, the corresponding copolymer is tailored to have a resultant glass transition temperature (Tg) of greater than about 20° C. In some embodiments, the Tg of the high Tg polymer additive is greater than 40° C., 50° C., or 60° C. In exemplary embodiments, the copolymers are (meth)acrylate copolymers. Such copolymers typically are derived from monomers comprising about 40% by weight to about 98% by weight, or at least 70% by weight, at least 85% by weight, or even about 90% by weight, of at least one alkyl (meth)acrylate monomer that, as a homopolymer, has a Tg of greater than about 20° C. Examples include vinyl monomers and alkyl (meth)acrylate monomers which, as homopolymers, have a Tg greater than 20° C., such as n-butyl methacrylate, methyl methacrylate, isobornyl acrylate, vinyl acetate, styrene, and the like.

Alkyl (meth)acrylate monomers with a Tg less than 0° C., such as monomers with alkyl groups comprising from about 4 carbon atoms to about 12 carbon atoms, including n-butyl acrylate, 2-ethylhexyl acrylate, isooctyl acrylate, isononyl acrylate, isodecyl acrylate, and mixtures thereof, may be utilized in conjunction with one or more of the high Tg alkyl (meth)acrylate monomers and copolymerizable basic or acidic monomers, provided that the Tg of the resultant (meth)acrylate copolymer is greater than about 20° C.

When the high Tg polymer additive is a basic copolymer, it is typically a basic (meth)acrylate copolymer. Basic (meth) acrylate copolymers typically are derived from basic monomers comprising about 2% by weight to about 50% by weight, or about 5% by weight to about 30% by weight, of a copolymerizable basic monomer. Exemplary basic monomers include the basic monomers described above.

When the high Tg polymer additive is an acidic copolymer, it is typically an acidic (meth)acrylate copolymer. Acidic (meth)acrylate copolymers typically are derived from acidic monomers comprising about 2% by weight to about 30% by weight, or about 2% by weight to about 15% by weight, of a copolymerizable acidic monomer. Exemplary acidic monomers include the acidic monomers described above.

In some embodiments, the copolymer of the high Tg polymer additive typically has an weight average molecular weight greater than 100,000. Higher molecular weight high Tg polymer is desirable because it enhances the thermal stability of the compatibilized blend, especially at elevated temperatures and extreme conditions. To utilize a high molecular weight high Tg polymer additive, other attributes of the high Tg polymer additive (such as monomer selection) and of the compatiblized blend (such as acid-base interaction level) are varied to retain compatability.

High Tg monomers are generally those monoethylenically unsaturated monomers which as homopolymers have a glass transition temperature (Tg) greater than about 20° C. Generally, the high Tg polymer is derived from monoethylenically unsaturated monomers, which as homopolymers have a Tg of greater than 20° C. Typically the high Tg polymer is independently derived from monoethylenically unsaturated monomers selected from the group consisting of (meth)acrylate esters of non-tertiary alkyl alcohols, the alkyl groups of which comprise from about 1 to about 20, or about 1 to about 18 carbon atoms as shown in Formula II (above); acidic or basic monomers as defined above; vinyl-terminated monomers; and combinations thereof.

In most embodiments, the high Tg polymers are independently derived from (meth)acrylate monomers, although, for certain formulations, vinyl-terminated monomers, such as styrene, may show comparable or superior results. Examples of suitable monomers useful in the present disclosure include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, bromoethyl methacrylate, 2-hydroxyethyl methacrylate, hydroxypropyl methacrylate, glycidyl methacrylate, allyl methacrylate, styrene, vinyl acetate, vinyl chloride.

The polymers herein, both polymers useful as the silicone-modified pressure sensitive adhesive component and polymers useful as the high Tg component, can be prepared by any conventional free radical polymerization method, including solution, radiation, bulk, dispersion, emulsion, and suspension processes. The silicone-modified pressure sensitive adhesive component may be prepared, for example, by methods described in U.S. Pat. No. 4,693,935 (Mazurek). The high Tg component may be prepared by methods described in US Patent Publication No. 2004/0202879 (Xia et al.).

While solventless embodiments are visualized within the scope of this disclosure, typically solvents are used in preparing the polymeric components useful in the temporarily repositionable pressure sensitive adhesive compositions. Suitable solvent, if desired, may be any liquid which is sufficiently inert to the reactants and product such that it will not otherwise adversely affect the reaction. Representative solvents include acetone, methyl-ethyl-ketone, heptane, and toluene and mixtures thereof. If used, the amount of solvent is generally about 30-80% by weight based on the total weight of the reactants (monomer and initiator) and solvent. The solvent may optionally be removed from the polymers prior to blending.

In order to increase cohesive strength of the coated optically clear, temporarily repositionable pressure sensitive adhesive composition, a crosslinking additive is incorporated into the blend. Two types of crosslinking additives are commonly used, ones that are used in thermal processes and ones that are used in photochemical processes. The first crosslinking additive is a thermal crosslinking additive such as a multifunctional aziridine. One example is 1,1'-(1,3-phenylene dicarbonyl)-bis-(2-methylaziridine) (Bisamide). Such chemical crosslinkers can be added into the solvent-based optically clear, temporarily repositionable pressure sensitive adhesive after polymerization and activated by heat during oven drying of the coated adhesive. Isocyanate and epoxy crosslinkers can also be used.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide reagent.

The second type of chemical crosslinker is a photosensitive crosslinker which is activated by high intensity ultraviolet (UV) light. Two common photosensitive crosslinkers used are benzophenone and copolymerizable aromatic ketone monomers as described in U.S. Pat. No. 4,737,559. Another photocrosslinker, which can be post-added to the solution composition and activated by UV light is a triazine, for example, 2,4-bis(trichloromethyl)-6-(4-methoxy-phenyl)-s-triazine. These crosslinkers are activated by UV light generated from artificial sources such as medium pressure mercury lamps or a UV blacklight.

Hydrolyzable, free-radically copolymerizable crosslinkers, such as monoethylenically unsaturated mono-, di-, and trialkoxy silane compounds including, but not limited to, methacryloxypropyltrimethoxysilane (available from Gelest, Inc., Tullytown, Pa.), vinyldimethylethoxysilane, vinylmethyl diethoxysilane, vinyltriethoxysilane, vinyltrimethoxysilane, vinyltriphenoxysilane, and the like, are also useful crosslinking agents. Multi-functional acrylates are useful for bulk or emulsion polymerization. Examples of useful multi-functional acrylate crosslinking agents include, but are not limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof. Crosslinking may also be achieved using high energy electromagnetic radiation such as gamma or e-beam radiation.

The amount and identity of crosslinker is tailored depending upon application of the adhesive composition. Typically, the crosslinker is present in amounts less than 5 parts based on total dry weight of adhesive composition. In some embodiments, the crosslinker is present in amounts from 0.01 parts to 1 part based on total dry weight of the adhesive composition.

Following copolymerization, other additives may be added with the resultant pressure sensitive adhesive blend composition provided the additive causes no adverse affect to the desired properties, such as optical clarity and environmental stability over time. For example, compatible tackifiers and/or plasticizers may be added to aid in optimizing the ultimate tack and peel properties of the optically clear, temporarily repositionable pressure sensitive adhesive. The use of such tack-modifiers is common in the art, as is described in the Handbook of Pressure Sensitive Adhesive Technology, edited by Donatas Satas (1982). Examples of useful tackifiers include, but are not limited to, rosin, rosin derivatives, polyterpene resins, coumarone-indene resins, and the like. Plasticizers which may be added to the adhesive of this disclosure may be selected from a wide variety of commercially available materials. In each case, the added plasticizer must be compatible with the optically clear, temporarily repositionable pressure sensitive adhesive. Representative plasticizers include polyoxyethylene aryl ether, dialkyl adipate, 2-ethylhexyl diphenyl phosphate, t-butylphenyl diphenyl phosphate, 2-ethylhexyl adipate, toluenesulfonamide. dipropylene glycol dibenzoate, polyethylene glycol dibenzoate, polyoxypropylene aryl ether, dibutoxyethoxyethyl formal, and dibutoxyethoxyethyl adipate. UV stabilizers as known in the art may also be added.

The composition of the present disclosure includes a silicone-modified pressure sensitive adhesive component and a high Tg polymer in an adhesive composition in any relative amounts that, in combination with the crosslinker and any other optional components, will result in a useful balance of properties of the adhesive, including, at least, temporary repositionability and optical clarity.

For the silicone-modified pressure sensitive adhesive component, an amount is included to provide the functional properties of a temporarily repositionable pressure sensitive adhesive, including a useful amount of tack or tackiness, temporary repositionability and other pressure sensitive adhesive properties. These and other properties of pressure sensitive adhesives, and the amounts necessary to achieve these properties, are well understood.

For the high Tg polymer, any amount can be included to provide sufficient stability and clarity, in a given application. An amount of high Tg polymer can be included to maintain optical clarity of the adhesive during use and over time, under conditions that would be experienced by the adhesive or a product that incorporates the adhesive. In particular, the amount of high Tg polymer can provide a bond that does not delaminate or bubble over time, under a variety of environmental conditions. The required bond strength will depend on the materials being bonded, but preferred amounts of high Tg polymer can provide adhesives according to the disclosure that will not bubble or delaminate over time when used to bond an outgassing material to a low moisture vapor transfer material.

Overall, the silicone-modified pressure sensitive adhesive component and high Tg polymer can be included in the adhesive composition in relative amounts that will provide a desired combination of pressure sensitive adhesive properties, adhesive bond properties, temporary repositionability and optical clarity. Typically, the adhesive contains a majority (i.e. greater than 50 wt %) of silicone-modified pressure sensitive adhesive component. In general, depending on factors such as the chemical identities and molecular weights, amount of cross-linking, etc., among other variables, typically at least 5 weight % and less than about 50 weight % high Tg polymer can provide a compatibilized adhesive composition that will have acceptable optical clarity. In some embodiments the optically clear, temporarily repositionable pressure sensitive adhesive composition may contain 5-30 weight % of high Tg polymer, or even 10-25 weight %.

The silicone-modified pressure sensitive adhesive component and high Tg polymer additive can be blended by traditional methods known to those skilled in the art. Such methods include mixing, mechanical rolling, hot melt blending, etc. Typically, the silicone-modified pressure sensitive adhesive component and the high Tg polymer additive are mixed in solution.

While solventless embodiments are visualized within the scope of this disclosure it is typically preferred that solvents are used in blending and coating the optically clear, temporarily repositionable adhesive compositions. In particular, solventless coating methods such as hot melt coating have been observed to cause orientation in the adhesive coating and this orientation can cause optical birefringence (see for example PCT Publication Number WO 97/22675). Optical birefringence is the resolution or splitting of a light wave into two unequally reflected or transmitted waves by an optically anisotropic medium. Suitable solvents include ethyl acetate, acetone, methyl ethyl ketone, heptane, toluene, and alcohols such as methanol, ethanol and isopropanol and mixtures thereof. If used, the amount of solvent is generally about 30-80% by weight based on the total weight of the components (polymers, crosslinkers and any additives) and solvent.

The adhesive compositions may be applied by any conventional application method, including but not limited to gravure coating, curtain coating, slot coating, spin coating, screen coating, transfer coating, brush or roller coating, inkjet printing and the like. The thickness of a coated adhesive layer, typically in the form of a liquid is in part dependent on the nature of the materials used and the specific properties desired. Exemplary thicknesses of an adhesive layer may be in the range from about 12 to about 200 micrometers or about 25 to 100 micrometers.

Exemplary embodiments involve coating the optically clear, temporarily repositionable pressure sensitive adhesive composition in a solvent. In alternative embodiments, copolymers are hot-melt coated, followed by subsequent cross-linking The optically clear, temporarily repositionable pressure sensitive adhesive may be disposed on a substrate. The substrate may be a release liner, a rigid surface, a tape backing, a film, or a sheet. The optically clear, temporarily repositionable pressure sensitive adhesive composition can be coated onto a release liner, coated directly onto a substrate, a film or a backing, or formed as a separate layer (e.g., coated onto a release liner) and then laminated to a substrate or film. In some embodiments the optically clear, temporarily repositionable pressure sensitive adhesive is a transfer tape, i.e. it is disposed between two release liners.

In some embodiments it may be desirable to impart a microstructured surface to one or both major surfaces of the adhesive. It may be desirable to have a microstructured surface on at least one surface of the adhesive to aid air egress during lamination. If it is desired to have a microstructured surface on one or both surfaces of the adhesive film, the adhesive coating or film may be placed on a tool or a liner containing microstructuring. The liner or tool can then be removed to expose an adhesive film having a microstructured surface. Generally with optical applications it is desirable that the microstructure disappear over time to prevent interference with optical properties.

The optically clear, temporarily repositionable pressure sensitive adhesive may be used to make adhesive articles. In some embodiments, the adhesive articles can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, cathode ray tubes, polarizers, reflectors, touch sensors and the like.

Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc), reflective sheeting and the like.

Articles are provided that include an optical film and an optically clear, temporarily repositionable pressure sensitive adhesive adjacent to at least one major surface of the optical film. The articles can further include another substrate (e.g., permanently or temporarily attached to the pressure sensitive adhesive layer), another adhesive layer, or a combination thereof. As used herein, the term "adjacent" can be used to refer to two layers or films that are in direct contact or that are separated by one or more layers or films. Often, adjacent layers or films are in direct contact.

Articles are provided that include a rigid substrate and a pressure sensitive adhesive article laminated to the rigid substrate. As used herein, the term "rigid substrate" refers to substrates that are rigid or substantially rigid. For example, rigid substrates include glass sheets, rigid polymeric sheets and display surfaces. Examples of applications where lamination of an adhesive article to a rigid substrate include, for example, CRT (cathode ray tube) and LCD (liquid crystal display) display screens protected by a film such as an antireflection (AR) film, a polarizer film or protective film. Examples of devices that may utilize such laminations include such devices as portable and non-portable information display devices including personal digital assistants, cell phones, touch-sensitive screens, wrist watches, car navigation systems, global positioning systems, projection television screens, computer monitors, notebook computer displays, and the like.

Optically clear, temporarily repositionable pressure sensitive adhesives are particularly useful in such systems, because, if defects are detected during fabrication of the devices containing them, the adhesive article may be removed from the substrate and repositioned to provide a defect-free lamination.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, barrier films, transparent metallized films, and antireflective films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. Nos. 6,049,419, 5,223,465, 5,882,774, 6,049,419, RE 34,605, 5,579,162, and 5,360,659.

The substrate included in the article can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. The substrate can be permanently or temporarily attached to an adhesive film. For example, a release liner can be temporarily attached and then removed for attachment of the adhesive film to another substrate.

The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Exemplary substrates include, but are not limited to, the outer surface of an electronic display such as liquid crystal display or a cathode ray tube, the outer surface of a window or glazing, the outer surface of an optical component such as a reflector, polarizer, diffraction grating, mirror, or lens, another film such as a decorative film or another optical film, or the like.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

In other embodiments, the substrate is a release liner. Any suitable release liner can be used. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048. The liner can have a microstructure on its surface that is imparted to the adhesive to form a microstructure on the surface of the adhesive film. The liner can then be removed to expose an adhesive film having a microstructured surface.

Some materials used in optical products may have particular physical or chemical properties that can create adverse effects within the optical product. As an example, some materials may outgas, compromising an adhesive bond if the outgassing affects the adhesive and adhesion. Some materials may be low in their ability to transmit moisture vapor, possibly exacerbating the effects of the outgassing layer on an intervening adhesive. The adhesives described herein can be useful, because the adhesives can be optically transmissive to resist combined effects such as outgassing and low moisture vapor transfer.

Thus, the disclosure includes the use of the described adhesive for any application, especially applications within optical products or optical elements, and especially to bond materials where an optically transmissive or clear adhesive is useful, required, or desired. The adhesives are particularly useful for bonding materials that tend to outgas, and where such outgassing tends to compromise integrity of an adhesive bond between the outgassing material and another material. In some embodiments the adhesives may be used to bond an outgassing material to a material that has a low moisture vapor transfer rate.

Exemplary adhesives can maintain useful optical transmissivity over a useful life of the adhesive, and can also maintain a secure bond strength and resist or avoid delamination or bubbling to maintain optical clarity between elements of a multilayer product, over a useful life. Such stability and retention of optical transmissivity can be measured by accelerated aging tests, whereby samples of adhesive optionally bonded to one or two other materials are exposed to elevated temperature, optionally with elevated humidity conditions, for a period of time. Several different accelerated aging protocols have been used for testing the aging properties of laminate structures. In some protocols heat is applied and humidity is not controlled, in other protocols both heat and humidity are controlled. One protocol is carried out by placing the laminate in an oven with controlled humidity at 90° C. and 90% relative humidity for a week and is called the "90° C., 90% RH" test. The results of the testing protocol are determined by visual observation to determine whether the optical properties of the sample are maintained. Further details of this protocol are presented below in the Examples section.

Examples of rigid substrates that can be included to provide support for an optical element include glass or rigid polymeric materials such as polycarbonates, polyacrylates, polyesters, etc. Often, such rigid polymeric materials, especially when relatively thick (for example in the range of millimeters or centimeters, as opposed to smaller dimensions), can exhibit a property of outgassing. This is a well-known and frustrating problem in optical products and optical elements. This outgassing problem can be exacerbated if the outgassing layer is bonded to a layer that does not allow the gas to pass through, but acts as a barrier to the gas, resulting in the gas collecting at the adhesive interface and causing bubbling or delamination, reduced bond strength, or loss of clarity. Adhesives of this disclosure offer improved bond strength and stability and can therefore reduce or eliminate such bubbling or delamination even where the adhesive is used to bond an outgassing substrate to a low moisture vapor transfer layer.

Specific examples of outgassing substrate layers include polycarbonates, such as polycarbonates having a thickness in the range from about one or three millimeters up to any larger thickness; and polyacrylates such as polymethyl methacrylate, for example having a thickness of at least one to three millimeters up to any larger thickness.

Materials considered to have low moisture vapor transmission rates are also known and understood and include certain chemistries and constructions of films, including polymeric films that may or may not include certain coatings that can effectively act as barriers to moisture vapor. The threshold level of moisture vapor transmissivity that can cause delamination, bubbling, loss of bond strength, or loss of clarity in a specific optical product construction can depend on various factors such as the composition of an outgassing substrate layer and the amount of gas it produces, conditions of use, and the composition and overall strength, integrity, and stability of an adhesive.

Other polymers or polymeric materials may be used in an optical element to provide, e.g., mechanical properties, conductivity, and optical functionalities such as diffusion, color, polarization, and the like. Examples of polymeric materials include, but are not limited to plastic films such as polypropylene, polyethylene, polyvinyl chloride, polyester (polyethylene tereplithalate), polyurethane, cellulose acetate, cellulose triacetate, ethyl cellulose, diffuse film, metallized polymeric film and ceramic sheet materials, and other optical film such as view angle compensation film. More specific examples include multilayer AR (antireflective) film such as described in U.S. Pat. No. 6,277,485, and microlayer films such as those described in U.S. Pat. No. 6,049,419, any of which can be reflective, partially reflective, or otherwise optically useful.

Test Methods
180 Peel Adhesion

This peel adhesion test is similar to the test method described in ASTM D 3330-90, substituting a glass substrate for the stainless steel substrate described in the test. Adhesive coatings on polyester film were cut into 1.27 centimeter by 15 centimeter strips. Each strip was then adhered to a 10 centimeter by 20 centimeter clean, solvent washed glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Two samples were tested; the reported peel adhesion value is an average of the peel adhesion value from each of the two samples.

Accelerated Aging Test

The testing was carried out by placing a laminate containing the adhesive to be tested in an oven with controlled humidity at 90° C. and 90% relative humidity for a week and is called the "90° C., 90% RH" test. The results of the testing protocol are determined by visual observation to determine whether the optical properties of the sample are maintained. The data are reported as either "Pass" if the sample retains its optical clarity, of "Fail" if bubbles (0.2 mm-5 mm in size) or blisters (large bubbles (>5 mm in size)) are visible.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

SYNTHESIS EXAMPLES

Synthesis Example S1

Preparation of SiMac

A methacrylate-terminated polydimethylsiloxane macromer was prepared as described in U.S. Pat. No. 4,693,935 (Mazurek) Example 64. The macromer, having an average

| Table of Abbreviations | |
|---|---|
| Abbreviation or Trade Designation | Description |
| MMA | Methyl methacrylate |
| BMA | n-butyl methacrylate |
| DMAEMA | (N,N-dimethylamino)ethyl methacrylate |
| IOA | Iso-octyl acrylate |
| AA | Acrylic Acid |
| PSA-1 | Silicone-modified pressure sensitive adhesive containing a ratio of 83/7/10 of IOA/AA/SiMac, prepared as described in Synthesis Example S2 below. |
| SiMac | Silicone macromer, methacrylate terminated siloxane, prepared as described in Synthesis Example S1 below. |
| Initiator-1 | Azo-bis(isobutyronitrile) initiator commercially available from E. I. duPont de Nemours & Co.; Wilmington, DE as "VAZO-64". |
| Polymer Additive 1 | High Tg methacrylate polymer prepared as described in Synthesis Example S3 below. |
| Bisamide Crosslinker | 1,1'-(1,3-phenylene dicarbonyl)-bis-(2-methylaziridine) |
| Initiator-2 | 2,2'-azobis-(2-methylbutyronitrile), an initiator commercially available from E. I. duPont de Nemours & Co.; Wilmington, DE as "VAZO-67". |
| PET Film | a primed polyester film of polyethylene terephthalate, 38 micrometers thick |
| $D_3$ | Hexamethylcyclotrisiloxane |
| THF | Tetrahydrofuran |
| PMMA | Polymethyl methacrylate plate of 3.0 millimeter thickness commercially available from Plaskolite, Inc, Columbus, OH. |
| PC | Polycarbonate plate of 4.4 millimeter thick LEXAN, commercially available from General Electric, Schenectady, NY. | molecular weight of about 10,000 grams/mole, was prepared using BuLi initiator. A flame-dried 1 liter three-necked flask equipped with a mechanical stirrer, condenser, and septum and purged with dry argon was charged with a dilute solution of $D_3$ (1 gram) in heptane (100 milliliters), both freshly dried. 5.5 milliliters of BuLi (1.7 M in hexane) (9.35 mmoles) was introduced and the initiation reaction was continued overnight at room temperature. 198.7 grams (0.89 mole) of $D_3$ in THF (496.8 g) was introduced into the reaction flask via polytetrafluoroethylene (PTFE) tubing and the polymerization was continued for 8 hours with the reaction mixture maintained at room temperature. Progress of the reaction was monitored by GC analysis of the reaction mixture. Thereafter the capping agent, 3-methacryloxypropyldimethylchlorosilane (2.26 g, 10.3 mmoles), was introduced and the reaction mixture was stirred for 1 hour, while additionally agitated with an ultrasonic bath which raised the temperature to about 40° C. The resultant polymer solution was poured into an excess of methanol with vigorous stirring. The separated polymer fraction was dissolved in ethyl ether and washed with water. The organic layer was dried with magnesium sulfate, filtered, and evaporated. The resultant polymer did not contain detectable quantities of low molecular weight materials, such as oligomeric siloxanes. The macromer produced was analyzed by gel permeation chromatography which gave the following results: $M_n=12,881$, $M_w=14,756$, and polydispersity of 1.14.

Synthesis Example S2

Preparation of PSA-1

A silicone-modified pressure sensitive adhesive was prepared by placing a mixture of IOA (83.0 parts by weight), AA (7.0 parts by weight), SiMac (10.0 parts by weight), ethyl acetate (30 parts by weight) and Initiator-1 (0.06 parts) were placed in a glass reaction bottle, purged with nitrogen, sealed and tumbled in a 55° C. water bath for 24 hours.

Synthesis Example S3

Preparation of Polymer Additive 1

In a glass reaction vessel were placed Initiator-2 (0.3 parts by weight), MMA (70 parts by weight), BMA (24 parts by weight), DMAEMA (6 parts by weight), and ethyl acetate (150 parts by weight). The resulting solution was degassed with nitrogen for 15 minutes, and the vessel was sealed and spun in a 65° C. water bath for 24 hours to yield a viscous solution (40 wt % solids). The polymer thus obtained had a weight average molecular weight of 112,000 and a Tg of 90° C.

Examples 1-4 and Comparative Example C1 and C2

For Examples 1-4 and Comparative Examples C1 and C2, blends of PSA-1, Polymer Additive 1, and Bisamide Crosslinker were prepared as described in Table 1. To prepare tape samples, the resulting mixtures were solvent cast on PET Film and dried in a 70° C. oven for 10 minutes to give a coating thickness of 25 micrometers (1.0 mil). Tape samples of Comparative Examples C1 and C2 and Examples 1 and 2 thus prepared were tested for 180° Peel Adhesion using the test method described above at various dwell times to a glass substrate. These data are presented in Table 2. Other tape samples of all examples were laminated to PMMA and PC and allowed to dwell for 24 hours. The laminates were then subjected to elevated temperature aging in a 90° C./90% RH chamber for 1 week as described in the test method above. These results are shown in Table 3.

TABLE 1

| Example | PSA-1 (Parts by weight) | Polymer Additive 1 (Parts by weight) | Bisamide Crosslinker (Parts by weight) |
|---|---|---|---|
| C1 | 100 | 0 | 0.05 |
| C2 | 99 | 1 | 0.05 |
| 1 | 95 | 5 | 0.05 |
| 2 | 90 | 10 | 0.05 |
| 3 | 90 | 10 | 0.10 |
| 4 | 90 | 10 | 0.15 |

TABLE 2

| Example | Initial Peel Adhesion (N/dm) | 1 Hour Peel Adhesion (N/dm) | 2 Hour Peel Adhesion (N/dm) | 24 Hour Peel Adhesion (N/dm) |
|---|---|---|---|---|
| C1 | 42.6 | 67.1 | 70.7 | 88.5 |
| C2 | 13.5 | 51.3 | 58.4 | 67.1 |
| 1 | 4.2 | 39.8 | 43.3 | 60.5 |
| 2 | 0.9 | 5.1 | 38.9 | 53.2 |

TABLE 3

| Example | Aged Laminate to PC | Aged Laminate to PMMA |
|---|---|---|
| C1 | Fail | Fail |
| C2 | Fail | Fail |
| 1 | Fail | Pass |
| 2 | Fail | Pass |
| 3 | Pass | Pass |
| 4 | Pass | Pass |

What is claimed is:

1. An adhesive composition comprising a blend of:
 a majority of a silicone-modified pressure sensitive adhesive component comprising:
 an acidic or basic functional copolymer comprising the reaction product of an acidic or basic monomer, a (meth) acrylic or vinyl monomer, and a silicone macromer;
 a high Tg polymer comprising an acid or base functionality;
 and a crosslinker;
 wherein the functionality of the silicone-modified pressure sensitive adhesive component and the functionality of the high Tg polymer form an acid-base interaction when mixed and the composition is a pressure sensitive adhesive.

2. The adhesive composition of claim 1 wherein the composition is optically clear on visual observation.

3. The adhesive composition of claim 1 wherein the high Tg polymer has a glass transition temperature greater than 20° C.

4. The adhesive composition of claim 1 wherein the high Tg polymer comprises a monomer selected from the group consisting of vinyl esters, (meth)acrylamide, styrenes, (meth) acrylontriles, substituted styrenes, vinyl halides, vinyl propionate, (meth)acrylates, and mixtures thereof.

5. The adhesive composition of claim 1 wherein the high Tg polymer is a basic copolymer.

6. The adhesive composition of claim 1 wherein the silicone-modified pressure sensitive adhesive is a (meth)acrylate copolymer formed from free-radically polymerizable monomers selected from the group of (meth)acrylates, vinyl monomers, and macromers.

7. The adhesive composition of claim 1 wherein the crosslinker is selected from the group consisting of multifunctional aziridine, peroxides, benzophenones, triazines, monoethylenically unsaturated mono-, di-, and trialkoxy silane compounds, diacrylates, triacrylates, tetraacrylates, isocyanates, epoxies, and mixtures thereof.

8. The adhesive composition of claim 1 wherein the silicone-modified pressure sensitive adhesive component comprises from 70 to 95 percent based on the weight of the total composition.

9. An article comprising:
a substrate, and
a pressure sensitive adhesive composition coated on at least one surface of the substrate, the pressure sensitive adhesive composition comprising a blend of:
a majority of a silicone-modified pressure sensitive adhesive component comprising:
an acidic or basic functional copolymer comprising the reaction product of an acidic or basic monomer, a (meth)acrylic or vinyl monomer, and a silicone macromer;
a high Tg polymer comprising an acid or base functionality;
and a crosslinker; wherein the functionality of the silicone-modified pressure sensitive adhesive component and the functionality of the high Tg polymer form an acid-base interaction when mixed.

10. The article of claim 9 wherein the substrate is selected from the group consisting of a release liner, a film, a sheet, a tape backing, and a rigid material.

11. A multi-layer assembly coated with an adhesive composition comprising a mixture of: a majority of a silicone-modified pressure sensitive adhesive component comprising at least one polymer with an acid or base functionality; a high Tg polymer comprising an acid or base functionality; and a crosslinker, wherein the functionality of the silicone-modified pressure sensitive adhesive component and the functionality of the high Tg polymer form an acid-base interaction when mixed, and wherein the adhesive composition is an optically clear pressure sensitive adhesive that bonds at least two layers together.

12. The multilayer assembly of claim 11 wherein the layers are selected from the group consisting of a release liner, a film, a sheet, a tape backing, and a rigid material.

13. The multilayer assembly of claim 11 wherein one of the layers is an outgassing layer.

14. A method of preparing a multi-layer article, the method comprising:
coating onto a substrate an adhesive composition comprising:
a mixture of: a majority of a silicone-modified pressure sensitive adhesive component comprising at least one polymer comprising an acid or base functionality; a high Tg polymer comprising an acid or base functionality; and a crosslinker, wherein the functionality of the silicone-modified pressure sensitive adhesive component and the functionality of the high Tg polymer form an acid-base interaction when mixed, and the composition is a pressure sensitive adhesive.

15. The method of claim 14 further comprising the step of laminating the adhesive coated substrate on a second substrate.

16. The method of claim 15, further comprising the step of repositioning the adhesive coated substrate on the second substrate.

17. The method of claim 14, wherein the adhesive composition is crosslinked after coating the adhesive composition on the substrate.

18. The method of claim 15 wherein the initial 180° Peel Adhesion upon lamination to the second substrate is in the range of 0.1-5 N/dm and 180° Peel Adhesion after 24 hour dwell is in the range of 50-100 N/dm.

19. A blend comprising:
a silicone-modified pressure sensitive adhesive component comprising an acidic or basic functional copolymer comprising the reaction product of an acidic or basic monomer, a (meth)acrylic or vinyl monomer, and a silicone macromer; and
a high Tg polymer additive comprising an acid or base functionality, wherein the functionality of the silicone-modified pressure sensitive adhesive component and the functionality of the high Tg polymer form an acid-base interaction when mixed.

20. The blend of claim 19, further comprising a solvent.

* * * * *